US007278920B1

(12) United States Patent
Klamer et al.

(10) Patent No.: US 7,278,920 B1
(45) Date of Patent: Oct. 9, 2007

(54) THEATER-BASED GAMING SYSTEM ENABLING A MULTI-PLAYER GAME THROUGHOUT A SYSTEM OF THE THEATERS

(75) Inventors: Paul R. Klamer, La Canada, CA (US); Darrell Ronnie Otwell, Newbury Park, CA (US)

(73) Assignee: Warner Bros. Entertainment, Inc., Burbank, CA (US)

( * ) Notice: Subject to any disclaimer, the term of this patent is extended or adjusted under 35 U.S.C. 154(b) by 499 days.

(21) Appl. No.: 10/334,146

(22) Filed: Dec. 31, 2002

(51) Int. Cl.
*A63F 9/24* (2006.01)
*A63F 13/00* (2006.01)

(52) U.S. Cl. .................. 463/34; 463/31; 463/40; 463/42

(58) Field of Classification Search .................. 463/31, 463/42, 36; 345/419; 359/29
See application file for complete search history.

(56) References Cited

U.S. PATENT DOCUMENTS

| | | | |
|---|---|---|---|
| 4,872,160 A | | 10/1989 | Hemmady et al. |
| 5,014,125 A | | 5/1991 | Pocock et al. |
| 5,287,437 A | * | 2/1994 | Deering ..................... 345/427 |
| 5,350,176 A | * | 9/1994 | Hochstein et al. ............ 463/42 |
| 5,428,528 A | * | 6/1995 | Takenouchi et al. .......... 463/42 |
| 5,778,187 A | | 7/1998 | Monteiro et al. |
| 5,799,002 A | | 8/1998 | Krishnan |
| 5,867,502 A | | 2/1999 | Chang |
| 5,935,245 A | | 8/1999 | Sherer |
| 5,946,614 A | | 8/1999 | Robbins et al. |
| 5,973,722 A | | 10/1999 | Wakai et al. |
| 5,983,005 A | | 11/1999 | Monteiro et al. |
| 6,011,782 A | | 1/2000 | DeSimone et al. |
| 6,097,720 A | | 8/2000 | Araujo et al. |
| 6,119,163 A | | 9/2000 | Monteiro et al. |
| 6,141,336 A | | 10/2000 | Bauchot et al. |
| 6,151,632 A | | 11/2000 | Chaddha et al. |
| 6,157,635 A | | 12/2000 | Wang et al. |
| 6,189,039 B1 | | 2/2001 | Harvey et al. |
| 6,195,680 B1 | | 2/2001 | Goldszmidt et al. |
| 6,259,701 B1 | | 7/2001 | Shur et al. |
| 6,363,075 B1 | | 3/2002 | Huang et al. |
| 6,363,429 B1 | | 3/2002 | Ketcham |

(Continued)

OTHER PUBLICATIONS

Sims, D. Undersea and in the Air: VR offers a thrill a minute. Sep. 1995. IEEE Xplore, pp. 15-18.*

(Continued)

*Primary Examiner*—Robert E Pezzuto
(74) *Attorney, Agent, or Firm*—Fish & Richardson P.C.

(57) ABSTRACT

A multiple player game for more than one player at more than one location may be created by enabling input to and control of a gaming environment by a first player at a first location, receiving a gaming dataset related to the input to and control of the gaming environment by a second player at a second location that is different from the first location; and displaying the gaming environment for the first player on a first screen that is operated by a first commercial entity. The first player interfaces with the first commercial entity and the second player interfaces with a second commercial entity, where the first and second commercial entities each differ from either of the first and second players. The first and second commercial entities commercialize services related to the gaming environment to at least one of the first and second players.

55 Claims, 14 Drawing Sheets

U.S. PATENT DOCUMENTS 6,415,312 B1    7/2002    Boivie
6,434,622 B1    8/2002    Monteiro et al.
6,490,285 B2    12/2002   Lee et al.

OTHER PUBLICATIONS

Virtual Adventure. [online] [retrieved on Dec. 01, 2005]. Retrieved from the Internet: <URL: http://vr-atlantis.com/vr_systems_guide/15.html>.*

Blizzard Entertainment. Diablo II Manual. 2000.*

O'Haver. Fourier Filter. [online] [retrieved on Dec. 01, 2005] Retrieved from the Internet: <URL: http://www.wam.umd.edu/~toh/spectrum/FourierFilter.html>.*

Choi et al., Design of a Flexible Open Platform for High Performance Active Networks, 1999, St. Louis, Missouri.

Keller et al., An Active Router Architecture for Multicast Video Distribution, St. Louis, Missouri.

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

PCT International Search Report, Apr. 8, 2003, 6 pages.

Apodaca, P., "Game of Risks", 4 pages, Dec. 14, 1993, cited at http://vr-atlantis.com/Ibe_ html/vwe_article5.html.

* cited by examiner

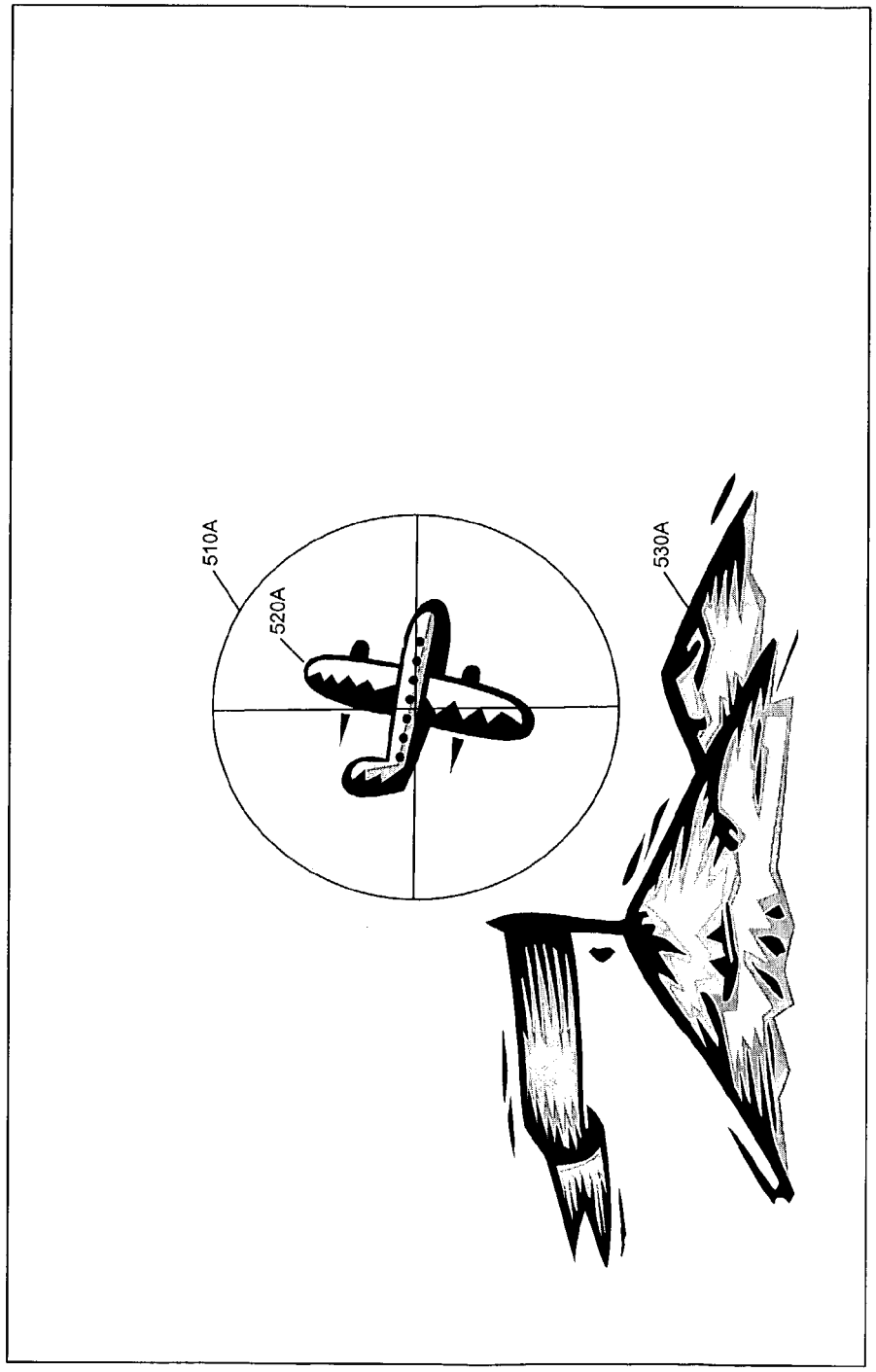
Fig. 5A (first-person perspective for game)

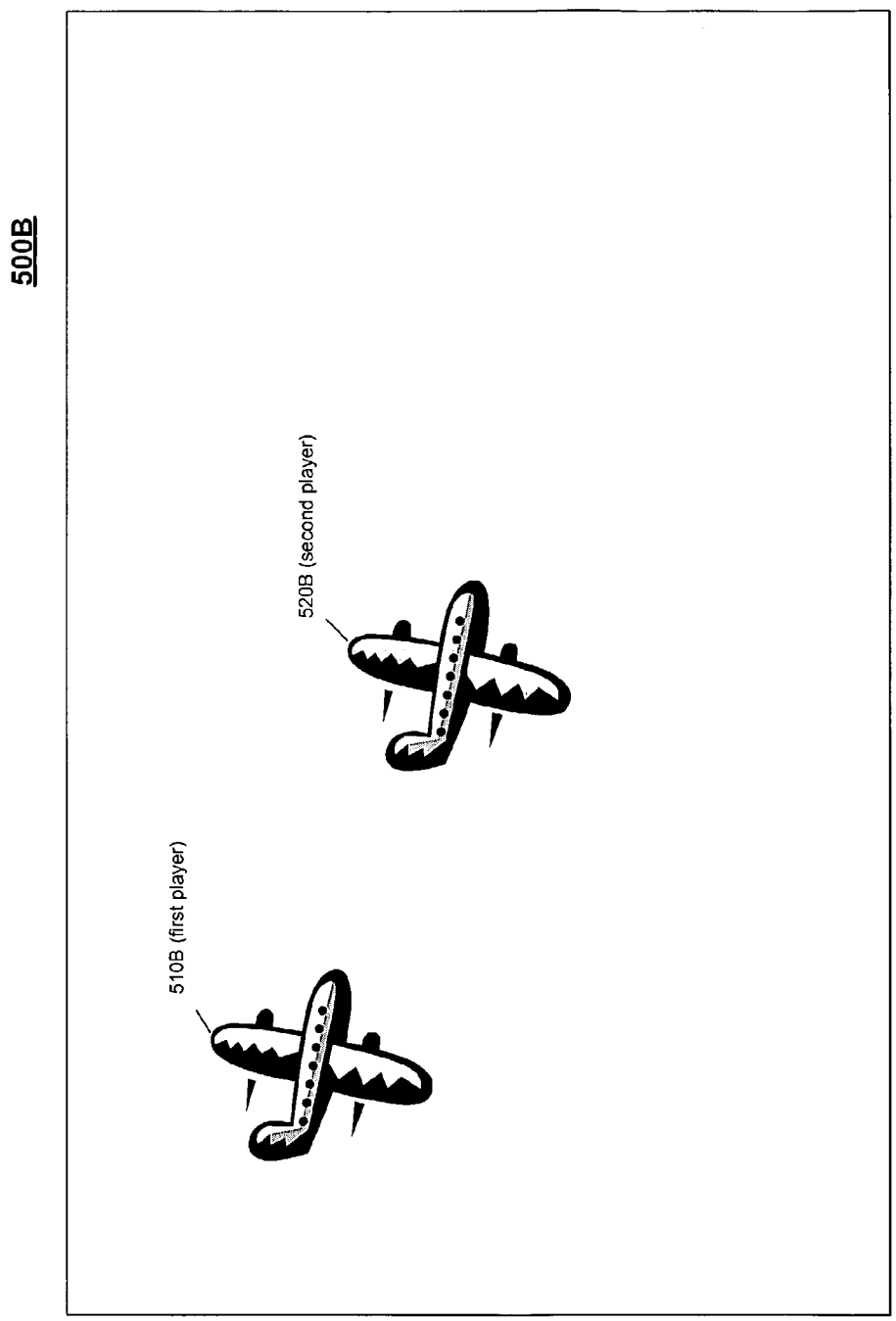
Fig. 5B (third-person perspective for game)

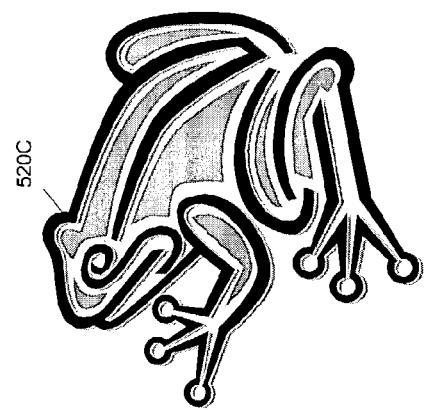
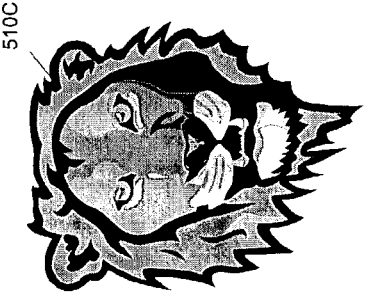
Fig. 5C

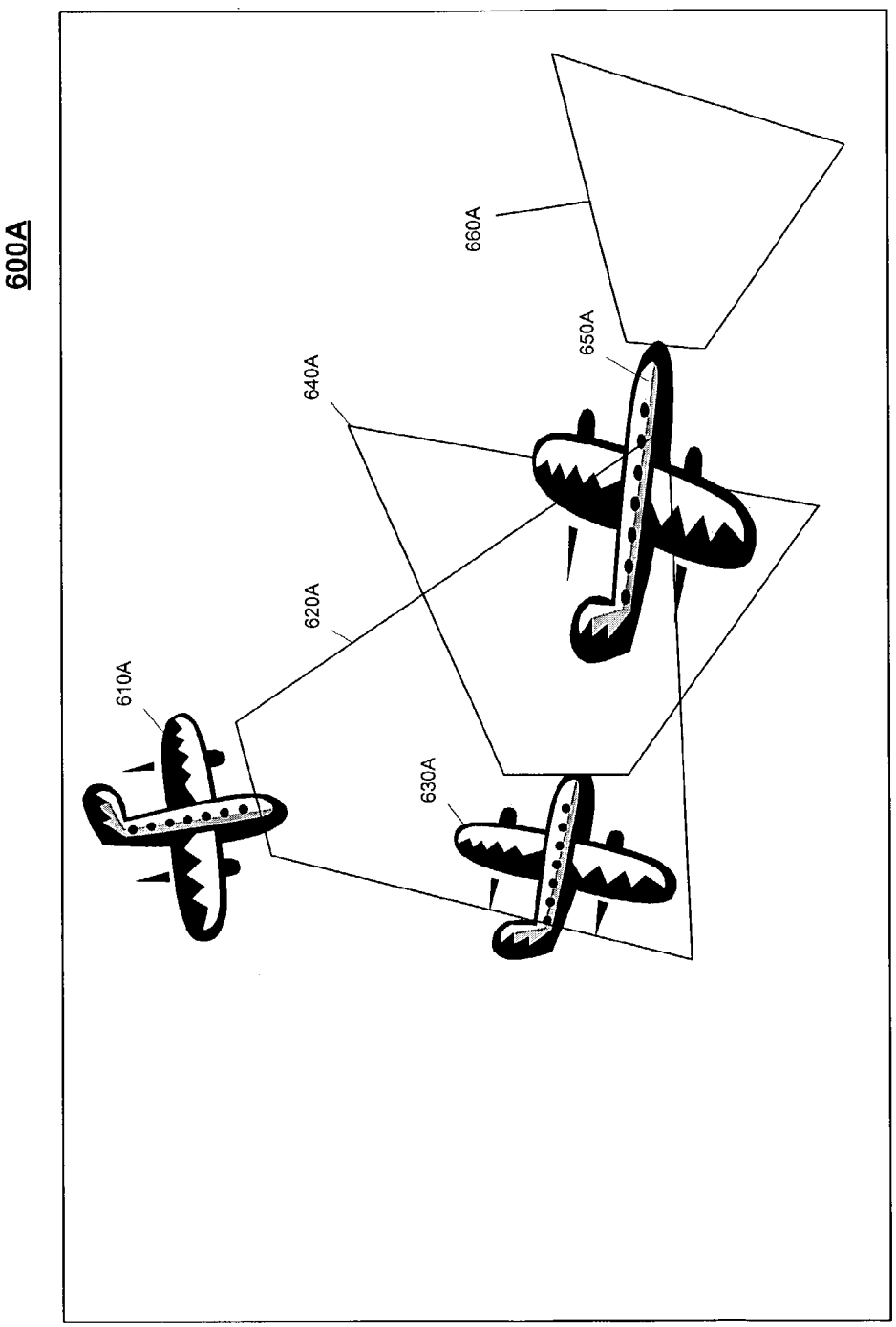
Fig. 6A (Map)

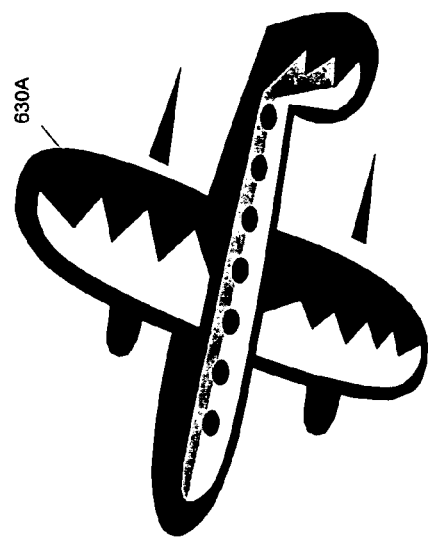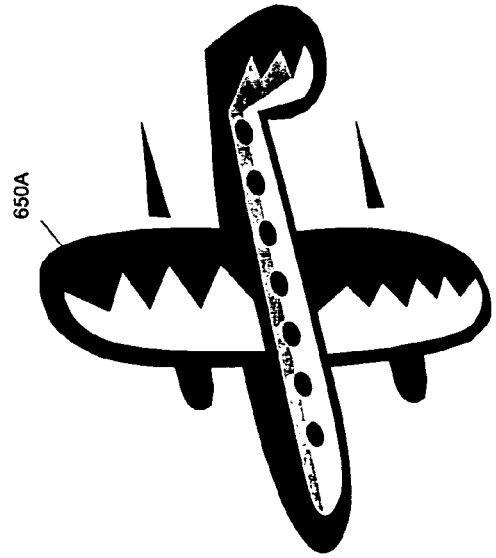
Fig. 6B (First player view)

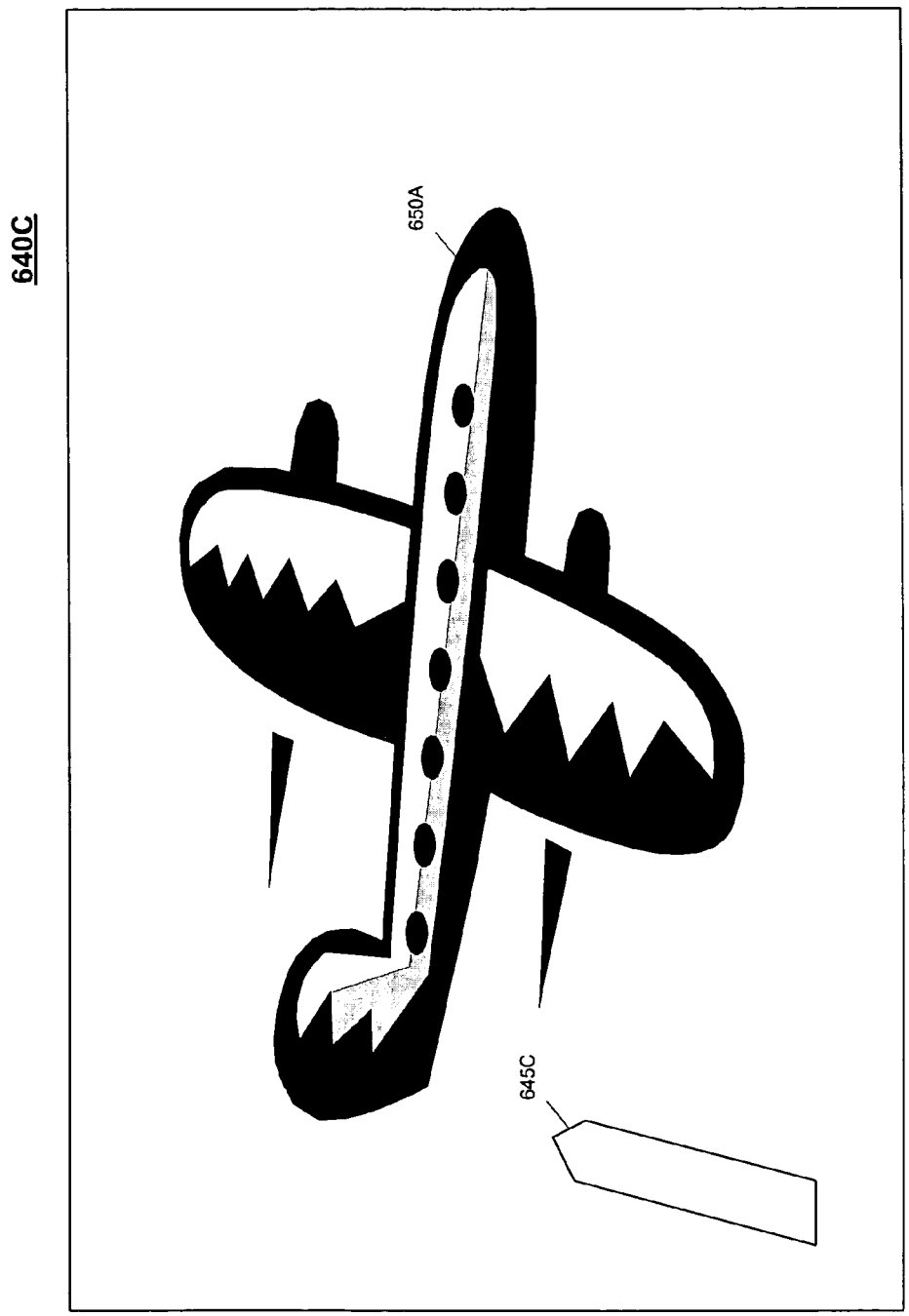
Fig. 6C (Second player view)

THEATER-BASED GAMING SYSTEM ENABLING A MULTI-PLAYER GAME THROUGHOUT A SYSTEM OF THE THEATERS

TECHNICAL FIELD

This description relates to gaming systems, and more particularly to multiplayer gaming systems.

BACKGROUND

Movie theaters typically include high quality audio-visual systems. The visual and sound systems present in a theater may include the most advanced technologies designed to make the theater experience realistic and intense. Similarly, the visual display systems may include a high-resolution display.

SUMMARY

In one general aspect, multiple player games may be enabled for concurrent and interactive participation by more than one player at more than one location. For instance, input to and control of a gaming environment may be enabled by a first player at a first location and by a second player at a second location that is different from the first location. The gaming environment for the first player may be displayed on a first screen that is operated by a first commercial entity, and the gaming environment for the second player may be displayed on a second screen that is operated by a second commercial entity. The first and second commercial entities may each differ from either of the first and second players, and either or both of the first and second commercial entities may commercialize services related to the gaming environment for at least one of the first and second players.

Implementations may include a system or program capable of achieving the above features.

The details of particular implementations are set forth in the accompanying drawings and the description below. Other features will be apparent from the description and drawings, and from the claims.

DESCRIPTION OF DRAWINGS

FIG. 5A is an exemplary first person perspective in a theater-based gaming system.

FIG. 5B is an exemplary third person perspective in a theater-based gaming system.

FIG. 5C is an exemplary theater screen showing how multiple displays may be generated on the same theater screen in a theater based gaming system.

FIG. 6A is an exemplary map of a virtual game layout in a theater-based gaming system.

FIG. 6B is an exemplary display of a first player, the first player represented in the map shown in FIG. 6A FIG. 6C is an exemplary display of a second player, the second player represented in the map shown in FIG. 6A.

Like reference symbols in the various drawings indicate like elements.

DETAILED DESCRIPTION

A theater-based gaming system is provided to enable concurrent and interactive play of a game by multiple players at multiple commercial locations. A first player inputs and controls the games environment at a first location while a second player independently inputs and controls the game's environment at a second location. The environments for the first and second players are displayed on screens that are operated by one or more commercial entities, which commercial entities differ from either of the first and second players. As such, a business may capitalize on online or remote gaming by hosting one or more sites for such gaming, and charging players for the opportunity to participate at their physical premises.

The following simplified example illustrates the operation of a theater-based gaming system. In this example, a first user purchases a ticket at a first theater to enter a theater configured to participate in a gaming environment. To join the game, the first user rents a game controller with gaming glasses and connects this game controller to a game connection point in the theater. A second user at a second theater may do the same to join a game, that is, to retrieve a stored game identity that is associated with a particular configuration or online identity so that the users may play the game, view the game and control a perceivable display, and/or message each other (e.g., to coordinate team activity). Thus, a single theater may simultaneously host multiple players or viewers. Upon joining the game, the first and second users may compete against other players in other theaters. For example, in an air combat simulation, they may work together in trying to shoot down their opponents.

Figure 1:
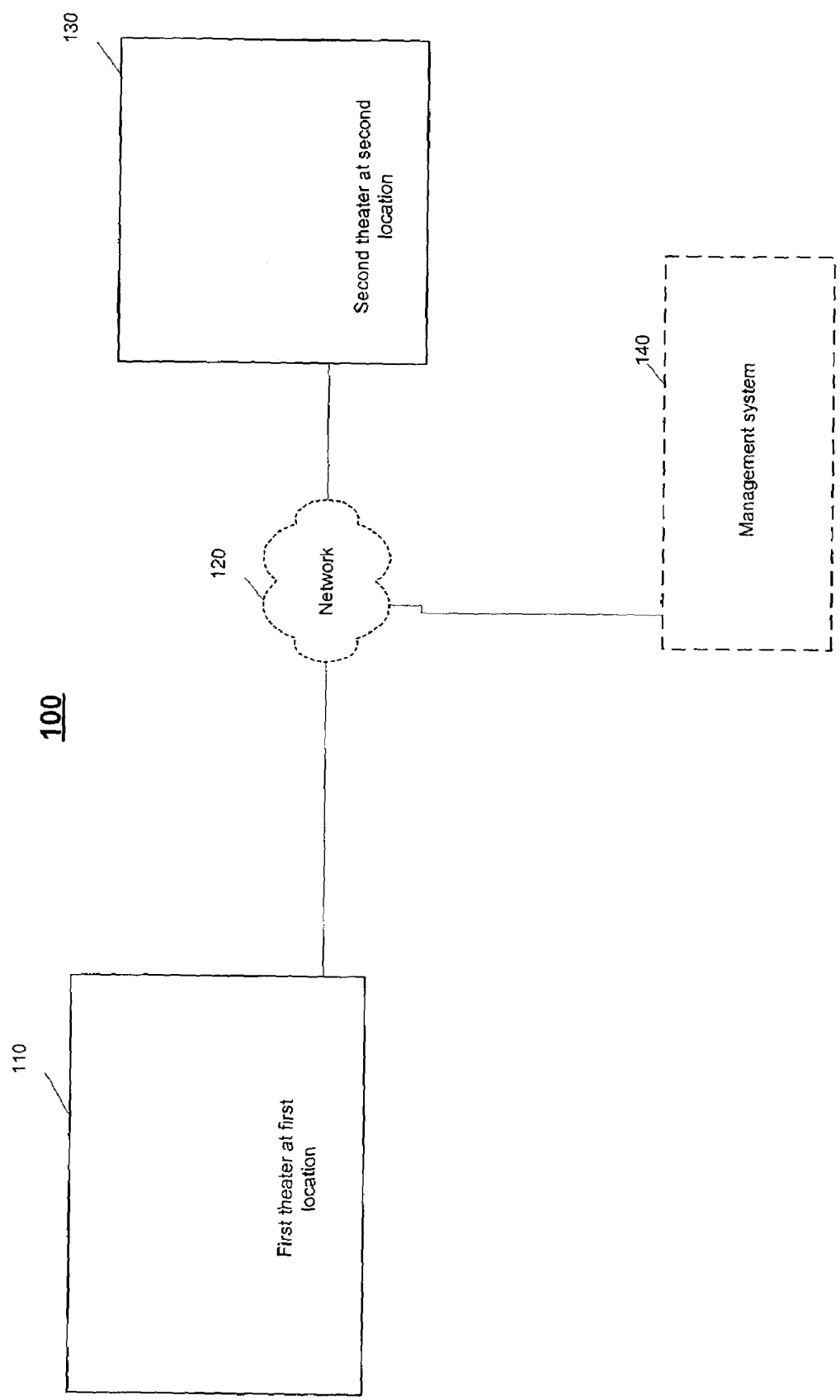
FIG. 1 is a diagram of an exemplary theater-based multiplayer gaming system.

FIG. 1 is a diagram of a theater-based gaming system 100 configured to enable multiple players to compete in a game at multiple locations. Specifically, a first player in a first theater 110 at a first location may interface through a network 120 to participate in a game with a second player in a second theater 130 at a second location. The gaming system 100 may include a first theater 110, a network 120, a second theater 130, and a management system 140.

Generally, the first theater 110 and the second theater 130 are movie theaters configured to support a multiplayer gaming environment. Specifically, the first and second theaters may be operated as commercial entities configured to provide commercial services related to the gaming environment. Examples the commercial services may include a theater that provides a gaming environment and that collects entrance or participation fees and ancillary fees (e.g., equipment rental) from game participants (e.g., players and/or viewers). The revenues need not be realized directly from the participants; for example, revenues may be realized through advertisements and sponsorships. Furthermore, the revenues may be realized in an automated manner. For example, a user may have an associated online account/ identity that is associated with an electronic payment method.

Different commercial entities may be part of a single unified or several distinct theater systems, and each commercial entity may support multiple users at one or more locations. For example, the first theater 110 may be located in an east coast company's theater while the second theater 130 may be located in a west coast company's theater. A first player may be in the east coast company's theater while the second player may be in the west coast company's theater. The east coast company's theater may have multiple participants. Alternatively, a first player may participate in a first theater of the east coast company while the second player participates in a second theater of the east coast company.

The network 120 may include hardware and/or software capable of enabling direct or indirect communications between the first theater 110 and the second theater 130. As such, the network 130 may include a direct link between the first theater 110 and the second theater 130, or it may include one or more networks or subnetworks between them (not shown). Each network or subnetwork may include, for example, a wired or wireless data pathway capable of carrying and receiving data. Examples of the network 120 include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Generally, the management system 140 is configured to manage the gaming environment for games available at the first and second theaters. Depending on the configuration of the gaming system 100, the operations performed by the management system 140 may differ. For example, if a player console local to either of the first or second theaters 110 and 130 is configured to perform many of the tasks, the management system 140 may perform a limited number of tasks. For example, when a player's console manages the display, and inputs, the management system 140 may manage the theater screen, the sound systems, and the interplayer gaming data. In another example, when the player's consoles are more limited, the management system may manage the displays and inputs, in addition to the theater screen, the sound systems, and the interplayer gaming data.

Although management system 140 is shown as interfacing with the gaming system 100 through the network 120, aspects of the management system may be distributed in more than one location, and/or as part of one or more of the theaters 110 and 130. For example, the management system 140 may reside in an intelligent switch (not shown) as part of network 120. The intelligent switch may be configured to manage traffic flows for the gaming environment. In another example, each player may have a gaming console which performs some game management. The game consoles may interface with a server which integrates multiple consoles. Furthermore, one or more servers may be tied together to create an array of management systems.

Additional theaters and/or gaming systems may be coupled into the gaming system 100. For example, the first theater 110 may include a theater in a cinema complex while the second theater 130 may be a theater in the same cinema complex. In another example, non-theater-based gaming systems may participate in the gaming environment.

Figure 2:
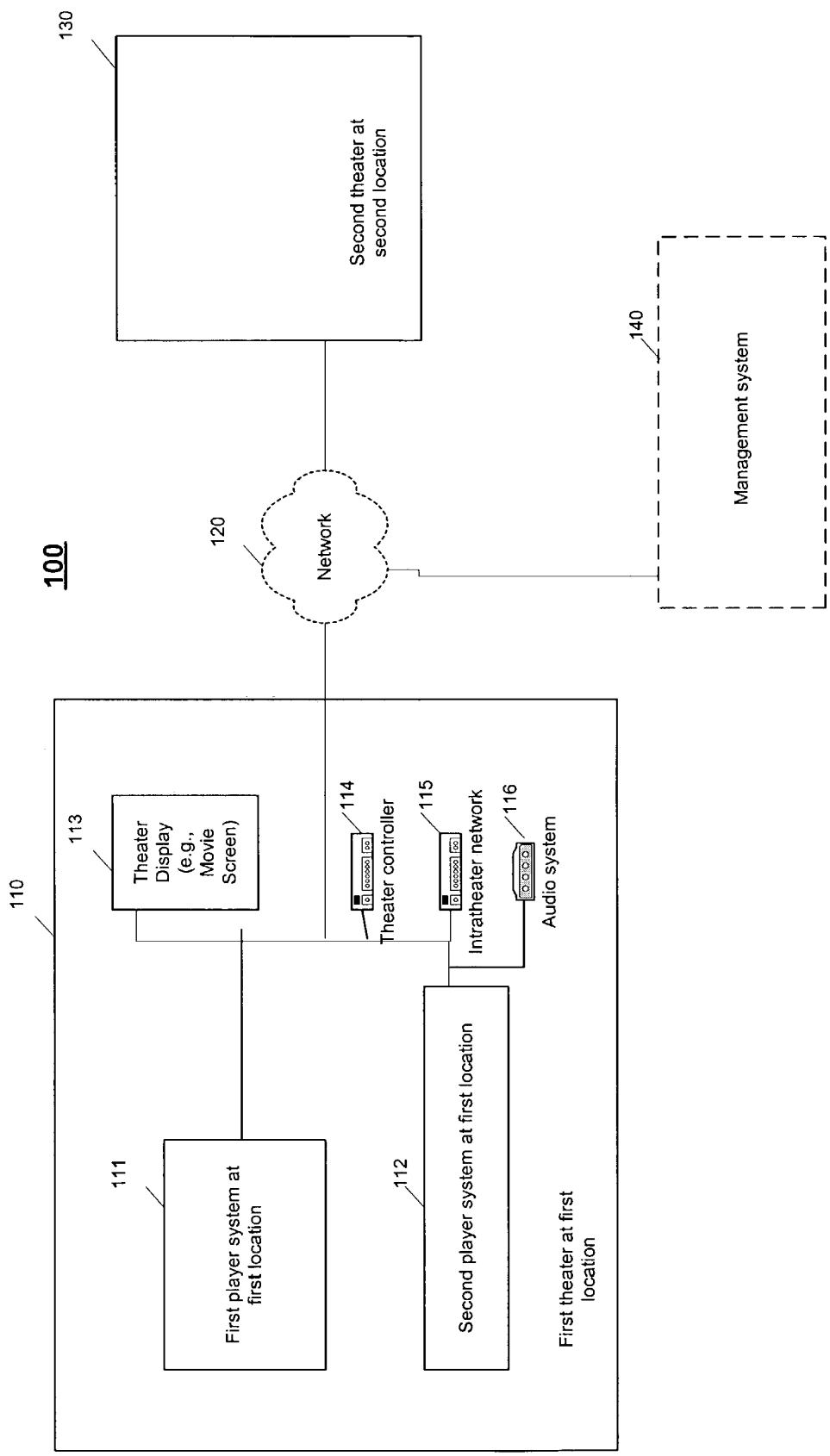
FIG. 2 is a diagram of an exemplary theater configuration in a theater-based multiplayer gaming system.

FIG. 2 is a diagram of a theater configuration in a theater-based multiplayer gaming system. Generally, the systems described in FIG. 2 relate to systems described in FIG. 1. For example, the first theater 110 uses the network 120 to interface with the second theater 130. Similarly, the management system 140 may be used to control one or more aspects of the gaming environment, for example, through network 120. However, FIG. 2 illustrates a theater that is configured to support the multiplayer game. Specifically, theater 110 includes a first player system 111, a second player system 112, a theater display 113, a theater controller 114, an Intratheater network 115, and an audio system 116. Generally, a player system (e.g., first player system 111 and/or second player system 112) is configured to access a theater controller 114 and/or an intratheater network 115 to participate in a gaming environment, which may be displayed in theater display 113.

Generally, the first player system 111 and the second player system 112 are configured to enable input to and control of a gaming environment by a player operating the player system. The first player system 111 and the second player system 112 may share one or more pieces of hardware and/or software. For example, the first player system 111 and second player system 112 may be included in a console having joysticks, with each player using one joystick.

The theater display 113 is configured to display the gaming environment for the players on a screen operated by a commercial entity. For example, the theater display 113 may include a movie screen and a projector configured to interface with one or more player systems, where the player systems communicate with the projector directly or indirectly through one or more intermediary systems.

A movie screen (not shown) in the theater display 113 may include a passive surface without active elements, that is, without electronic components, displays or devices or the movie screen may include an active surface with electronic components, displays, and devices used to enhance the gaming environment. In one example, the movie screen may include sensors to respond with the first player system. With sensors behind the screen, the player may interact with a displayed image, appearing to target an image in the screen. The first player system 111 may transmit an infrared signal that the screen sensors then detect, and use to modify the gaming environment (e.g., registering that a target has been struck).

The theater display 113 may use filtering techniques to create multiple displays for multiple players. For example, the theater projection system and/or movie screen may use polarization filtering techniques to control the images seen by one user. For example, participants in the theater may be divided into two teams. Images to be displayed for a first team may be oriented with a first polarization while images to be displayed for a second team may be oriented with second polarization. In this example, each player may be outfitted with a pair of glasses that filter the available images so that the appropriate polarization is displayed.

Other techniques to generate multiple displays may be used. For example, the image displayed on the theater display 113 may be coupled to a set of time slotted glasses, where each display (e.g., for a particular player or team) is shown during a time slot and blocked during other time slots. The glasses and images may feature a luminescent element enhancing the quality of the time-slotted image. For example, the time-slotted lens may include an element configured to continue displaying the image received from the theater display 113 for an extra time slot as the glasses are filtering a different time slotted display. In another example, the projector may project multiple displays, each encoded according to a different Fourier transform. Each player's display then may be viewed by using a set of glasses configured to perform the appropriate Fourier filtering/transform.

Regardless of whether polarized, time-slotted, Fourier, or other techniques are used, the filtering techniques may compensate for the distance between the display and the player. For example, if a certain seat is a certain distance away, the filtering glasses can compensate for that distance by adjusting the filtering. Thus, compensation for distortion and errors introduced by the distance may be made as the display and/or filtering is performed.

The theater controller 114 may be used to control the gaming environment within the theater and enable the gaming environment to be shared across more than one theater. Generally, the theater controller 114 includes one or more devices configured to interconnect the player systems (e.g., first player system 111 and second player system 112) so that multiple player systems may share a gaming environment with the theater systems (e.g., the theater display 113 and/or the theater audio system 116).

Depending on the configuration of the player systems and/or the commercial entity operating the theater, the configuration of the theater controller 114 may vary. For example, when the player systems include only a joystick, they may interface with a game system controller configured to operate as a theater controller 114. In another example, the players may bring their own player systems and connect their player system to other game systems and/or an Intratheater network 115. For example, a player may connect their player system into an Intratheater network 115 with the Intratheater network 115 acting as the controller that connects the player systems, the theater display 113, and the audio system 116.

Controlling the gaming environment within the theater may include managing the data sets for the players within the theater. For example, the theater controller 114 may determine that a first player's data set should be shared with a second and third players' system.

The theater 110 may include an audio system 116. Generally, the audio system 116 provides audio support in a theater and includes one or more speakers in the theater. The audio system 116 may be configured to provide an emulated listening experience (e.g., Dolby™ sound). The audio information may be localized and theater-wide sound. For example, a first portion of the theater may be provided with audio signals of interest to a first group, while a second portion of the theater receives a different audio signal. Each "team-based" signal may be associated with a set of one or more speakers from which it is played.

Figure 3:
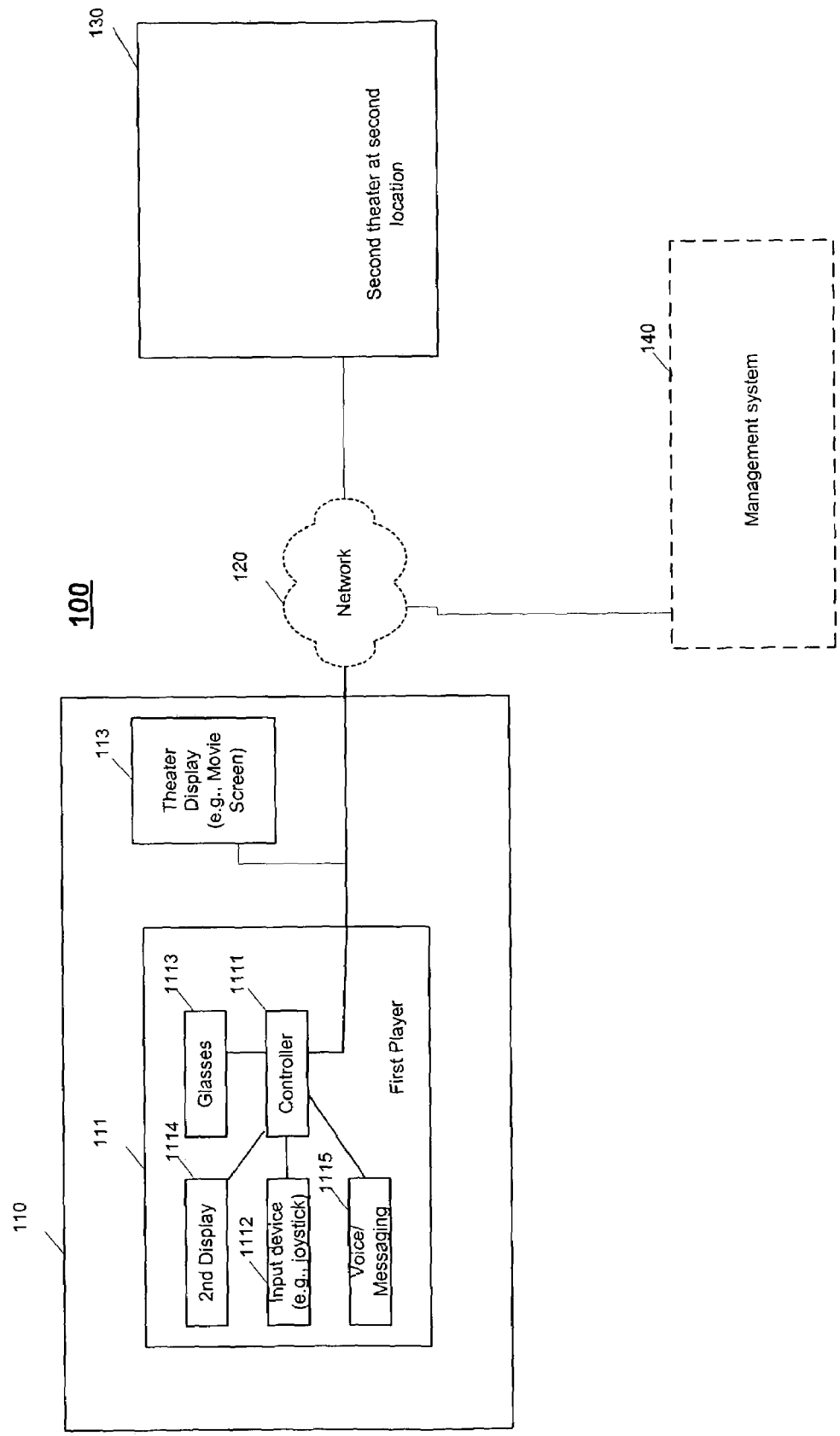
FIG. 3 is a diagram of an exemplary player system in a theater-based multiplayer gaming system.

FIG. 3 is a diagram of a player system in a theater-based multiplayer gaming system. Generally, the systems in the gaming system 100 shown in FIG. 3 relate to the gaming systems 100 described previously. For example, the first theater 110, the network 120, the second theater 130, and the management system 140 generally relate to the first theater 110, the network 120, the second theater 130, and the management system 140 described in FIGS. 1-2. However, FIG. 3 illustrates a first player system 111 that is configured to enable the first player to participate in the multiplayer gaming environment. The first player system 111 includes a player controller 1111 that enables communications of and operations by using an input device 1112, glasses 1113, a second display 1114, and a voice/audio/messaging device 1115.

Generally, player controller 1111 is configured to enable input to and control of a gaming environment by a first player at a first location. The player controller 1111 may include a device configured to run gaming software. The player controller 1111 may include one or more devices capable of interfacing in a multiplayer gaming environment. The player controller 1111 may include a controller (not shown) that processes instructions received from or generated by a software application, a program, a piece of code, a device, a computer, a computer system, or a combination thereof, which independently or collectively direct operations of the player controller 1111. The instructions may be embodied permanently or temporarily in any type of machine, component, equipment, storage medium, or propagated signal that is capable of being delivered to the player controller 1111 or that may reside with the controller at player controller 1111. Player controller 1111 may include a general-purpose computer (e.g., a personal computer (PC) 112) capable of responding to and executing instructions in a defined manner, a workstation, a notebook computer, a PDA ("Personal Digital Assistant"), a wireless phone, a component, other equipment, or some combination of these items that is capable of responding to and executing instructions. Player controller 1111 may include a game system designed to run game software.

In one implementation, the player controller 1111 includes one or more gaming software applications (e.g., a game stored on a CD, a game cartridge, a hard drive, or downloadable from a network) capable of interfacing with other devices in the gaming system 100. The gaming applications may run on a general-purpose operating system and a hardware platform that includes a general-purpose processor and specialized hardware for graphics, communications and/or other capabilities.

The input device 1112 may include one or more devices configured to enable a player to control aspects of a multiplayer game. Typically, the input device 1112 includes a physical device configured to capture physical exertions of the player and translate those exertions into an electronic data set. This electronic data set then may be used to control virtual game systems and the interplay of different virtual gaming systems in the gaming environment. The input device 1112 may include a joystick, a game pad, steering wheel, throttle, keyboard, or some other device configured to map a user's physical exertions into electronic data sets. The input device 1112 may be shared by more than user. For example, if the virtual gaming system is a complex device (e.g., a modern jet fighter), the input device may be configured so that more than one player may share the input device 1112 and/or the virtual gaming system (e.g., a pilot and a navigator in a virtual fighter aircraft).

The glasses 1113 may be configured to filter a subset of displays from multiple displays generated from a theater display 113. For example, the glasses 1113 may be configured to filter using the polarized, time-slotted, and Fourier-filtered techniques described previously. The glasses may be configured to enable a personal display over a common display. For example, several players may share a common view. However, within the common view, a personalized heads up display may be generated to display gaming data particular to each player.

The second display 1114 may include an auxiliary display, personalized for a player. For example, the second display 1114 may include a LCD ("Liquid Crystal Display") configured to attach to a player controller 1111. The LCD may display gaming data particular to the player. For example, in an air combat game, the LCD may be used to display airplane data (e.g., a radar display).

The voice/audio/messaging device 1115 generally is configured to enable the different players to exchange communications with one another through the gaming environment. In one example, the voice/messaging device may include a keyboard and a software application enabling users to send instant messages to one another. In another example, the audio/messaging device 1115 may include headphones with a microphone configured to enable voice communications between the players. The communications may include one-one or one-many communications. For example, in one-one communications, a first player may speak directly to a second player without other players being able to receive the communications. In one-many communications, a first play may wish to broadcast a message to multiple gaming participants.

The voice/messaging system 1115 also may be used to provide personal audio content from the gaming environment. For example, each user may have a specific sound environment based on their state in the gaming environment. For example, a racing game may feature different Doppler sounds based on whether a player is passing or being passed by another car. These player-specific sounds may be transmitted through the audio system 116, which may include player-specific speakers, for example, headphones.

Figure 4:
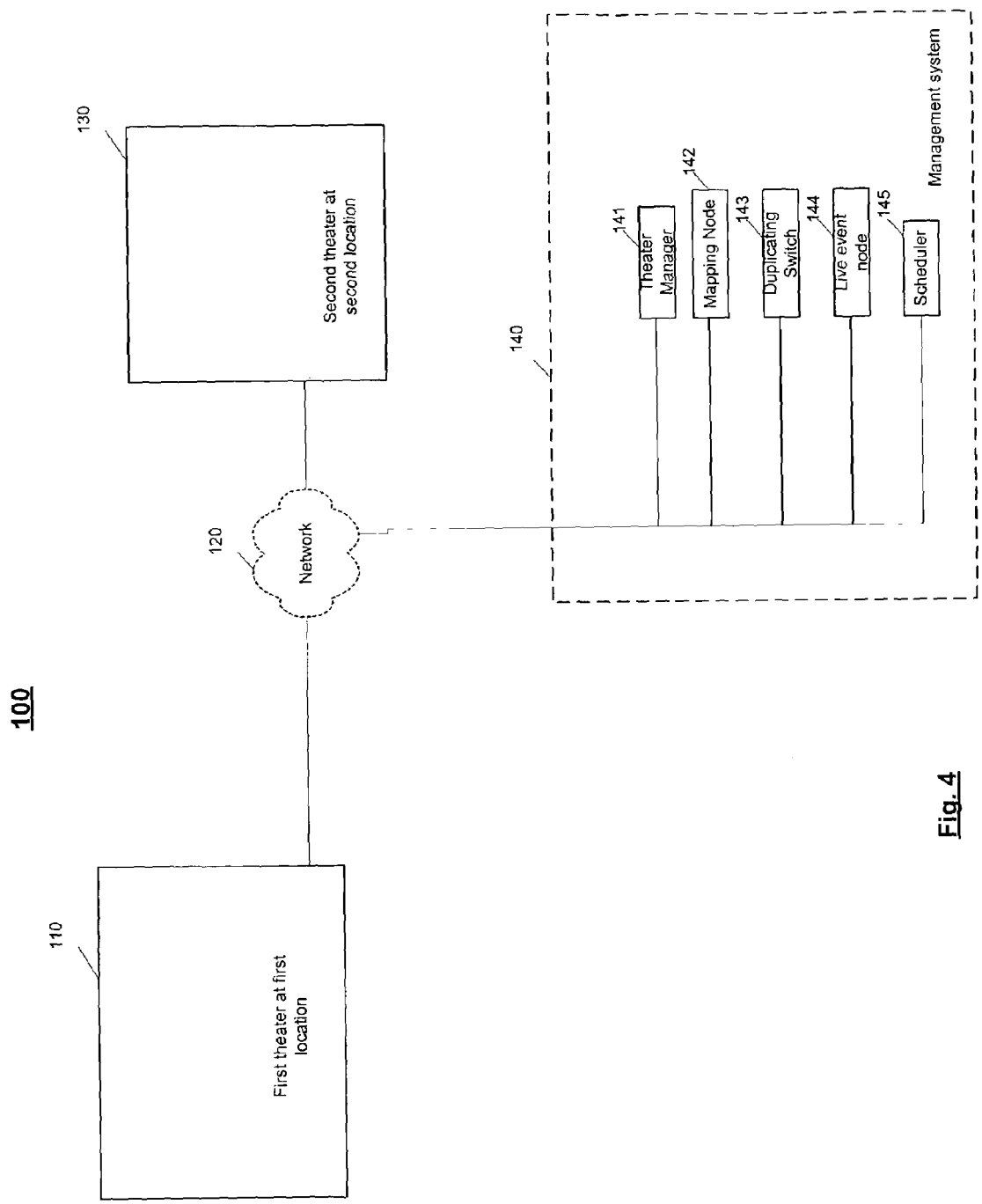
FIG. 4 is a diagram of an exemplary management system in a theater-based multiplayer gaming system.

FIG. 4 is a diagram of a management system in a theater-based multiplayer gaming system 100. Specifically, management system 140 may use one or more systems to manage the gaming environment between players in two or more theaters at two or more locations. Generally, the systems described in gaming system 100 have been described previously. For example, the first theater 110, the network 120, the second theater 130, and the management system 140 generally relate to the first theater 110, the network 120, the second theater 130, and the management system 140 described in FIGS. 1-3. However, FIG. 4 illustrates a configuration of the management system 140 that enables managing of the gaming environment.

The management system 140 may include a theater manager 141 configured to manage the communications between two theaters, a mapping node 142 configured to map and filter data sets from different players to other players, a duplicating device 143 configured to transmit the data sets to one or more other systems, a live feed node 144 configured to enable players access to a live event, and a scheduler 145 configured to manage the scheduling of the theaters. In general, each of the systems may be independently or collectively implemented by a general-purpose computer capable of responding to and executing instructions in a defined manner. Examples of the devices used as management systems may include a personal computer, a special purpose computer, a workstation, a server, a device, a component, or other equipment or devices capable of responding to and executing instructions. The management system may be arranged to receive instructions from one or more of a software application, a program, a piece of code, a device, a computer, a computer system or a combination thereof, which independently or collectively directs operations, as described herein. The instructions may be embodied permanently or temporarily in any type of machine, component, storage medium, or propagated signal that is capable of being delivered to hosts.

The theater manager 141 is configured to manage the gaming session between theaters. Generally, the theater manager 141 enables management and administrative operations that may include authenticating users, theaters, and gaming environments. Other management operations may include accounting for revenue, time, and software licenses. Still, other management operations may include more game-focused tasks such as controlling the game environment (e.g., the number of players, the capability and configuration of the virtual gaming systems), launching and terminating the gaming environment, and configuring the player controllers 111 and/or theater systems (e.g., the theater display 113 and the theater controller 114).

The mapping mode 142 is a system configured to manage the mapping of data sets between different player consoles. For example, the mapping node may determine that two players do not interact with one another in the gaming environment.

The duplicating device 143 may include a duplicating switch configured receive gaming data sets, duplicate the gaming data sets, and transmit the duplicated gaming data sets to multiple clients. Generally, a duplicating switch includes a device that performs network operations and functions in hardware (e.g., in a chip or part of chip). In some implementations, the duplicating switch may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

Although a duplicating device 143 is described as a duplicating switch, a server or host also may be used to duplicate the gaming data set.

The live event node 144 is a device configured to assimilate data representing a live event (e.g., a car race or baseball game) and transform that assimilated data into a format for use as a gaming data set. For example, the theater game may feature a car racing game where players compete against an actual car race going on. The car race may be logically represented so that players can virtually compete against actual cars. Similarly, a baseball game may be digitally represented so that players can virtually participate in an actual baseball game. Generally, the live event node receives telemetry or other data describing the data event, and converts the live event data into a format so that other devices in the gaming system 100 may process the live event data. For example, the gaming system 100 may receive an IP stream describing the position of one or more cars. The live event node 144 then may convert these positions, and make them computer-generated players in the game. Alternatively, the live event node 144 may receive a data set already formatted for incorporation into the gaming environment. In one example, the live event node then may transmit the live event gaming data set to a duplicating device 143 for subsequent duplication into the gaming environment.

Although the live event node 144 is shown as part of the theater gaming management system, the live event node 144 may be located at a separate and distinct location than the other devices in the management system 140 and the gaming system 100. For example, in the case of a racing game, the live event node 144 may be located at the racetrack where the live event data is being collected. Alternatively, the live event node 144 may be distributed across more than one location. For example, there may be telemetry equipment that tracks the actual car position may be located at the racetrack, a server that converts the telemetry data into an IP stream may be located in a data center, and a program that converts the IP stream into a gaming data set for the gaming environment may be a program, interface, or server located in a theater (e.g., a virtual interface on the duplicating device 143, or on the theater manager 141).

The scheduler 145 is configured to manage the availability of gaming environments with respect to allotted theater time. For example, a theater may determine that additional theaters may be used for gaming during daytime hours, while gaming operations need to be reduced during the evening to accommodate an increased demand for theatergoers. Accordingly, the scheduler 145 may enable the game to be played at identified theaters during the daytime, but terminate gaming environments as the featured movie times approach in the evening.

The scheduler 145 may include a state manager that enables a previously played gaming environment to be loaded, and a currently playing gaming environment to be saved. For example, a particular gaming environment may have an active following where members wish to return to that same gaming environment. Accordingly, the scheduler may save the state of the game upon a designated termination time. The scheduler then may notify members (e.g., via email or instant messaging) about the schedule for the virtual gaming environment. Alternatively, members of that gaming environment may 'vote' or coordinate calendars to schedule resuming the game at a time preferred by at least some members.

Although management system 140 may be configured to operate independent of theaters 110 and 130, management system 140 also may be individually provided with each or either of theaters 110 and 130. For example, when the management system 140 is independent of theaters 110 and 130, the management system 140 may be located in a national data center configured to aggregate multiple theater systems. Alternatively, in an example where management system 140 is provided with theater 110, the management system may provide management services for theater 110, and selectively forward communications as needed to other systems. Thus, local communications may be managed internal to theater 110 with intertheater communications may be forwarded as need to other theater managers and/or regional managers theater managers.

FIG. 5A displays a first-person perspective 500A in a theater-based gaming system. A first-person perspective 500A generally describes the perspective represented to be that of the actual participant in the gaming environment. For example, perspective 500A is a simplified display in an air-combat game. In the example of the air combat game shown, the perspective 500A is the perspective that might be presented to a first participant from the perspective of their cockpit. In the example shown, the first participant is presented crosshairs 510A indicating an aim point for available weapons, a representation of another airplane 520A and a relationship of that airplane 520A to the crosshairs 510A and terrain 530A to add to the realism of the gaming environment.

FIG. 5B is a third person perspective 500B in a theater-based gaming system. A third person perspective generally describes a perspective where a player sees a third party view of their virtual gaming system. In the example of the air combat game, perspective 500B is a display showing airplanes 510B and 520B of first and second players. The perspective 500B may be presented to either or both of the first and second players.

Perspectives 500A and 500B both may be used in the theater-based gaming system 100. For example, perspective 500A may be the display a theater gaming participant sees when they look through their glasses 1113. Alternatively, the first player might see the perspective 500A on a second display 1114, while the theater screen shows a perspective 500B proving an overview of the action for non-playing viewers. Either perspective may be used independently or the perspectives may be used collectively. For example, a game might feature only first or third person perspectives. Alternatively, a player may control the selection of the perspective.

FIG. 5C is a theater screen showing how multiple displays may be generated on the same theater screen in a theater based gaming system. Display 500C shows two objects for on a display that would be viewed by two or more players. Display 500C shows a lion 510C. representing an image to be shown to a first player and a frog 520C representing an image to be shown to a second player. Generally, the filtering techniques described previously may be used to generate different displays from the common display 500C.

Figure 5D:
FIGS. 5D and 5E show first and second displays of several exemplary available displays, illustrating how the multiple displays on the theater screen may be selectively filtered to provide different displays.
Figure 5E:
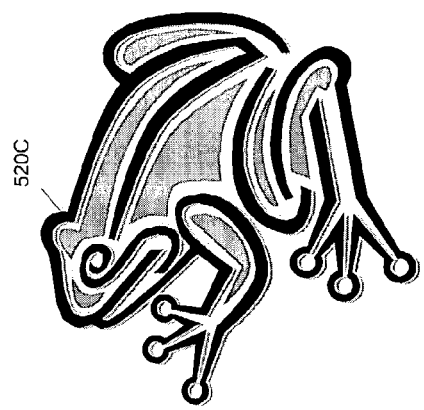

FIGS. 5D and 5E show the different displays 500D and 500E available from the common display 500C described in FIG. 5C. Displays 500D and 500E illustrate how the multiple displays on the theater screen may be selectively filtered to provide different displays. For example, in display 500D, the lion 510C appears while the frog 520C has been filtered out. Alternatively, in display 500E, the frog 520C appears while the frog 510C has been filtered out.

Generally, FIGS. 6A-6C illustrate a gaming environment that generates three different displays based on a common representation (e.g., a map) of the virtual gaming environment. As the theater-based gaming environment changes, the theater systems described previously may generate different outputs (e.g., in the theater display 113 or the audio system 116) based on the current state of the gaming environment and where a particular user in the gaming environment.

FIG. 6A is a map 600A of a virtual game layout in a theater-based gaming system. Map 600A is an exemplary layout of three airplanes appearing in an air combat game. Map 600A includes a first airplane 610A representing the virtual gaming system for a first player, the field of view 620A showing a perspective of a pilot or player operating the first airplane 610A, a second airplane 630A representing the virtual gaming system for a second player, a field of view 640A showing a perspective of a pilot or player operating the second airplane 630A, a third airplane 650A representing a computer controlled opponent, and a field of view 660A representing a perspective from the third airplane 650A.

FIG. 6B shows the display 620A made available to the pilot of the first airplane 610A or others seeking their perspective. Specifically, the second airplane 630A and third airplane 650A that fall within the field of view 620A in map 600A appear in the display 620B with second airplane 630A pursuing third airplane 650A.

In the exemplary air combat game shown, the airplanes are trying to target each other. Typically, this involves placing the opponents airplanes in the field of view a launching a weapon at the airplane appearing in the field of view. For example, the display associated with the second field of view 640A is shown in FIG. 6C. As is shown on map 600A, the third airplane 650A lies in the second field of view 640A. Accordingly, display 620C shows only airplane 650A. Display 640C also shows a weapon 645C (not shown in FIG. 6A) available for use against the third airplane 650A.

Figure 7:
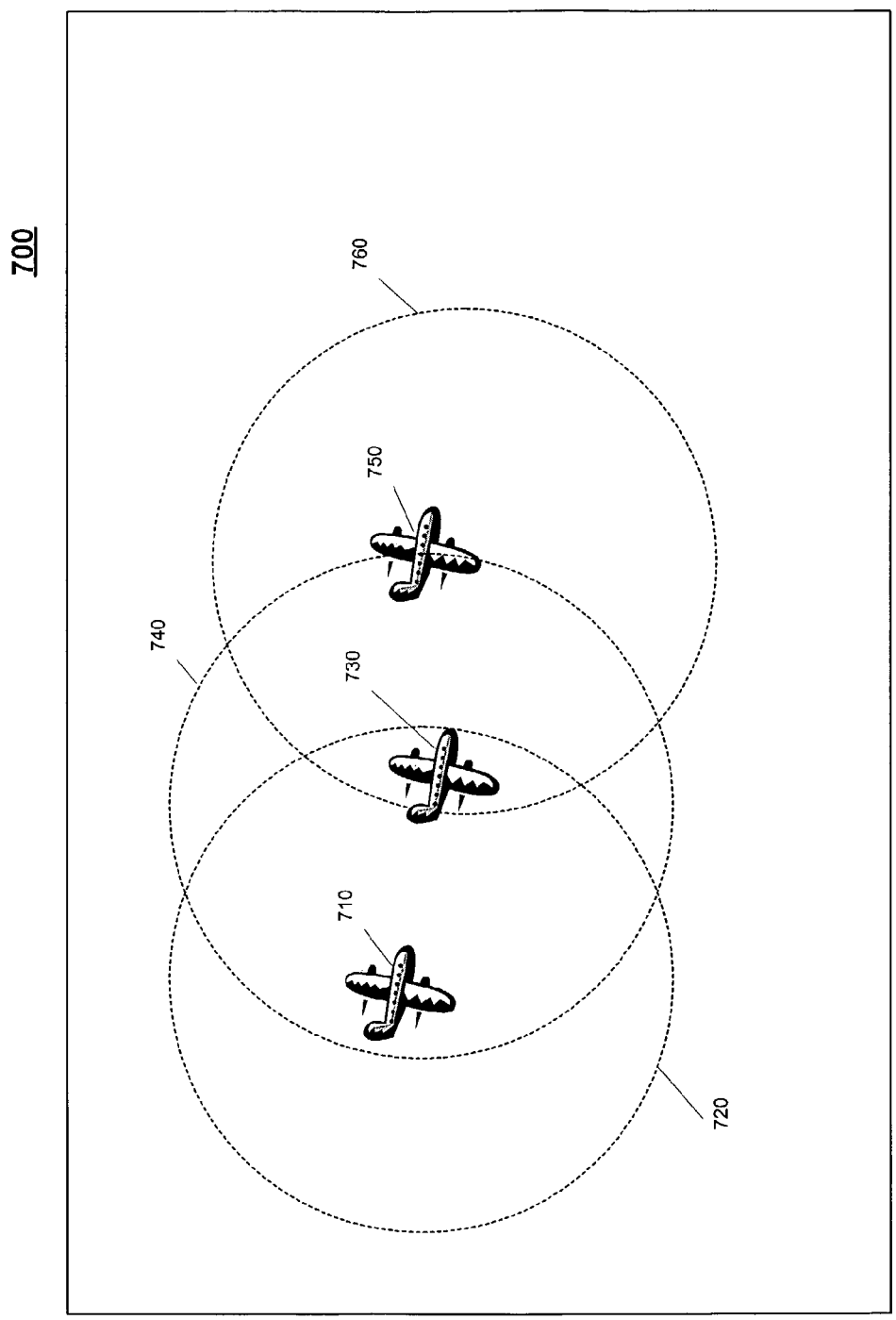
FIG. 7 illustrates an exemplary map of the virtual gaming systems and shows which virtual gaming systems are proximate to other virtual gaming systems.

Referring to FIG. 7, a map 700 is used to determine the proximity of one player to another player. The proximity may be used to determine how to share gaming data sets between player consoles in the theater-based gaming system (e.g., using a mapping node 142). Generally, each virtual player representing a system in the gaming environment has a virtual location and a proximate radius. Each virtual player may be configured to receive gaming data sets related to other systems in the proximate zone and not receive gaming data sets for devices outside of the proximate zone. For example, map 700 includes airplanes 710, 730 and 750. The airplanes 710, 730, and 750 are associated with the proximate zones 720, 740 and 760, respectively.

The proximate zone 720 of airplane 710 includes airplane 730 but does not include airplane 750. Accordingly, the gaming data set related to airplane 730 is sent to the system controller airplane 710 while the gaming data set related to airplane 750 is not sent to the system controlling airplane 710. Airplanes 710 and 750 are both within the proximate zone 740 of airplane 730, so gaming data sets related to both aircraft are sent to system controlling airplane 730. Finally, airplane 710 does not fall within the proximate zone 760 of airplane 750 while airplane 730 does. Thus, the gaming data set related to airplane 730 is sent to the system controller for airplane 710 while the gaming data set related to airplane 750 would not be sent to the system controlling airplane 710.

Filtering gaming data sets for participants in theater-based gaming systems may conserve theater bandwidth and processing power. For example, the player controller 1111 in a theater may not be able to accommodate large number of participants in a multiplayer game. Accordingly, the theater-based gaming system may arrange the gaming environment and filter gaming data sets so that the gaming controller 1111 is not overwhelmed.

Figure 8:
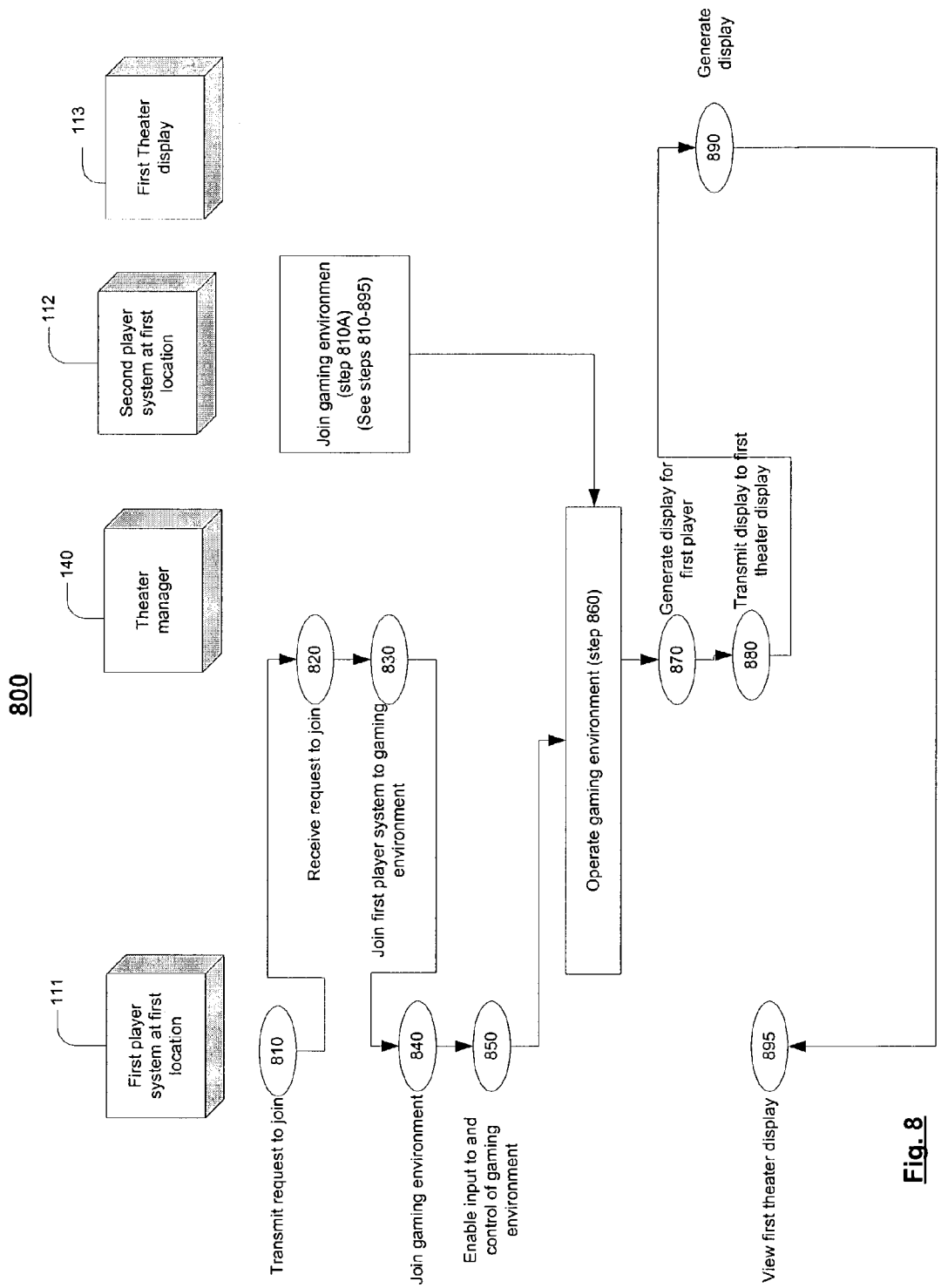
FIG. 8 is a flow chart showing how an exemplary theater-based gaming system may operate.

Referring to FIG. 8, a flow chart 800 shows an exemplary operation of a theater-based gaming system 100. Generally, the systems described in FIG. 8 relate to the systems described previously in FIGS. 1-7. For example, the first player system at the first location 111, the theater manager 140, and the first theater display 113 relate to the first player system 111, the theater manager 140, and the first theater display 113 described previously, and in FIGS. 2 and 3 in particular.

Initially, the first player system 111 at a first location transmits a request to join (step 810) that is received by the theater manager 140 (step 820). Requesting to join 810 may include determining that the rules of the game allow for the first player system to join. For example, some gaming environments may have a maximum number of players allowed to participate. Other gaming environments may limit when a player may join, for example, at the beginning and at certain intermissions in the game. In some instances, the first player system may be joined automatically. For example, the first play system may be joined by virtue of connecting the first player system to a theater system. Alternatively, joining the gaming environment may include associating the first player system with a gaming identity. For example, the virtual game system controlled by the first player system may be associated with a particular identity, for example, an "ace" or pilot whose identity persists for two or more sessions of air combat.

Requesting to join (step 810) may include retrieving a gaming environment identity. This identity may be used to determine the virtual game system configuration, that is, attributes of the system that the first player system 111 is controlling. For example, an aircraft may have a certain mix of munitions and a display of enemy aircraft "kills" painted on the fuselage. The online identity also may be used for messaging and to coordinate scheduling. Additionally, the online identity also may be used to enable the user to participate when the user is at a non-theater location.

Receiving a request to join 820 may include determining that the user operating the first player system 111 is a paying customer. This may be performed by charging an account electronically or verifying the account status of the user.

The theater manager 140 joins the first player system to the gaming environment (steps 830 and 840). Joining the gaming environment may include creating a virtual game system that is controlled in a virtual gaming environment. For example, in an air combat game, another aircraft may be inserted in the melee. When the virtual game system is part of a larger virtual gaming system (e.g., the side gunner on a WWII bomber), joining the gaming environment may activate that virtual game system for the first player system 111.

Joining the virtual gaming environment also may include temporally delaying the first player system until an entry point in the game is reached. For example, in addition to waiting for an intermission or a time out in the game, the theater manager may wait until a player leaves the virtual gaming environment.

Joining the virtual gaming environment may include load balancing or intelligently selecting an entry mode for a first player system 111. For example, if the teams are unbalanced or one team is experiencing an advantage, the newly joined first player system 111 may enter the game in accordance with the selection criteria. For example, the first player system may join the team with fewer players, or join a server that has the most available processing capacity to provide a better gaming experience.

Having joined the gaming environment, the first player system 111 is enabled to input and control the gaming environment (step 850). This may include creating a virtual gaming system for the first player, and enabling a joystick on the first player system to control the virtual gaming system. With the first player system 111 participating in the gaming environment, the gaming environment is operated (step 860). Generally, operating the gaming environment includes receiving the inputs and controls from the participating player systems, determining an action based on the inputs, determining a result and interaction of the inputs, and determining an appropriate state for the virtual gaming systems based on the results. For example, a player controlling an aircraft may direct their plane to turn. The theater manager 140 may receive the turning direction, determine the next state of the aircraft based on the turn, and determine how the turn affects other players (e.g., is the aircraft in their sights). With the next state of the gaming environment determined, the theater manager 140 may generate a display for the first player system 111 (step 870), and transmit the display to the first theater display 113 (step 880). The first theater display 113 receives the display and generates the display (step 890). Receiving the display may include performing some intermediary processing to create a user and theater specific display. For example, the display may be processed so that it is inserted into the appropriate time slot for the first player system.

With the display generated, the first player system 111 may view the first theater display (step 895). For example, a set of time slotted glasses may filter on the appropriate time slots.

Although participating in a theater-based gaming system was described using the first player system 111, the second player system 112 also may participate in the theater-based gaming system as was described with respect to step 810-895 and is shown by step 810A.

Other implementations are within the scope of the following claims. For example, the gaming data sets that are created in the course of operating the gaming environment may be processed by the systems described in FIG. 4. For example, a live event node 144 may receive a gaming data set from a NASCAR™ race. Similarly, a duplicating device 143 may receive a gaming data set and selectively replicate the gaming data set to participating users.

The first player system 111 may be connected by a wireless connection (e.g., infrared, Bluetooth, or 802.11b Ethernet). For example, a player may bring their gaming system with a wireless communications port into a theater-based gaming system. The theater-based gaming system then may selectively enable the controllers so that the participants may take turns participating in the game.

The invention claimed is:

1. A method of enabling a multiple player game to be played by more than one player at more than one location, comprising:
    enabling input to and control of a gaming environment by a first player at a first location;
    receiving a gaming dataset related to the input and control of the gaming environment by a second player at the first location;
    displaying the gaming environment on a first shared screen that is operated by a first commercial entity and is divided into two or more localized displays that render player-specific content;
    enabling the first player in the gaming environment to view a first of the localized displays and content displayed by the first localized display that is specific to the first player by viewing the first shared screen through a pair of filtering glasses having a first configuration corresponding to the first localized display, and
    enabling the second player in the gaming environment to view a second of the localized displays and content displayed by the second localized display that is specific to the second player and different than the content displayed by the first localized display by viewing the first shared screen through a second pair of filtering glasses having a second configuration corresponding to the second localized display.

2. The method of claim 1, further comprising receiving a gaming dataset related to the input and control of the gaming environment by a third player at a second location that is different from the first location, wherein the first player interfaces with the first commercial entity and the third player interfaces with a second commercial entity, the first and second commercial entities differing from either of the first and third players.

3. The method of claim 2 wherein the first and second commercial entities commercialize services related to the gaming environment for at least one of the first and third players.

4. The method of claim 1 wherein enabling input to and control a gaming environment includes enabling a first player to bring a personal gaming system belonging to the first player.

5. The method of claim 1 wherein enabling input to and control a gaming environment includes enabling a first player to bring a personal gaming system rented by the first player.

6. The method of claim 1 where receiving a gaming dataset related to the input to and control of the gaming environment by the first player further comprises receiving a dataset from a live vent that takes place outside of a gaming environment.

7. The method of claim 1 wherein the filtering glasses comprise a time-slotted filter configured to enable the first player to view less than all of the available time slots.

8. The method of claim 1 wherein the filtering glasses comprise a polarization filter configure to enable the first player to view less than all of the available polarizations.

9. The method of claim 1 wherein the filtering glasses comprise a Fourier filter configured to enable the first player to view the less than all of the available displays.

10. The met of claim 1 wherein the first and second filtering glasses are configured to display more than one game on the first shared screen.

11. The method of claim 1 where receiving a dataset from the live event that takes place outside of a gaming environment includes receiving a data set from an ongoing car race.

12. The method of claim 1 wherein the first player controls a subsystem that is part of a larger virtual system.

13. The method of claim 1 further comprising sharing gaining environment information through a duplicating switch the duplicating switch comprising hardware configured to receive a data set, duplicate content in the data set to a duplicated data unit, and transmit the duplicated data unit to one or gaming systems.

14. The method of claim 13 further comprising selectively filtering gaming environment information to prevent going environment information from being communicated between gaming systems based on rules established under a rule system for the game for preventing sharing of the information among player.

15. The method of claim 1 further comprising enabling a community of players to interact with one another in the gaming environment.

16. The method of claim 15 wherein the community of players interact with one another through messaging communications.

17. The method of claim 15 wherein the community of players interact with one another through voice communications.

18. The method of claim 15 wherein enabling the community of players to interact with one another comprises configuring virtual game systems with each player to be proximate to the virtual game systems of other players in the community of players so that the virtual game systems interact in the gaming environment.

19. The method of claim 15 further comprising enabling a first player to manage membership in the community of players.

20. The method of claim 19 wherein managing the membership comprises assembling the community of players.

21. The method of claim 15 ether comprising providing the community of members access to a private gaming environment, wherein access to the private gaming is limited to the community of members.

22. The method of claim 15 wherein the community of members is organized around a preference common to the community of members.

23. The method of claim 15 wherein the community of members comprises a team of virtual game systems.

24. The method of claim 1 further comprising enabling the first player to maintain a virtual identity that persists or two or more gaming sessions in the gaming environment.

25. The method of claim 1 further comprising archiving a state of the gaming environment so that the gaming environment may be resumed between a first session and a second session.

26. A multiple player game system comprising:
   a first player system structured and arranged to enable input to and control of a gaming environment by a first player at a first location;
   a second communications interface structured and arranged to receive communications related to input and control of the gaming environment by a second player at the first location; and
   a first display structured and arranged to:
      display the gaming environment on a first shared screen that is operated by a first commercial entity and is divided into two or more localized displays that render player-specific content;
      enable the first player in the gaming environment to view a first of the localized displays and content displayed by the first localized display that is specific to the first player by viewing the first shared screen through a pair of filtering glasses having a first configuration corresponding to the first localized display, and
      enable the second player in the gaming environment to view a second of the localized displays and content displayed by the second localized display that is specific to the second player and different than the content displayed by the first localized display by viewing the first shared screen through a second pair of filtering glasses having a second configuration corresponding to the second localized display.

27. The system of claim 26 further comprising receiving a gaming dataset related to the input and control of the gaming environment by a third player at a second location that is different from the first location, wherein the first player interfaces with the first commercial entity and the third player interfaces with a second commercial entity, the first and second commercial entities differing from either of the first and third players.

28. The system of claim 27 wherein the first and second commercial entities commercialize services related to the gaming environment for at least one of the first and third players.

29. The system of claim 26 further comprising a second display interface structured and arranged to enable the display of the gaming environment for the third player on a second screen that is operated by a second commercial entity.

30. The system of claim 26 wherein the first player system is structured and arranged to enable a first player to bring a personal gaming system belonging to the first player.

31. The system of claim 26 wherein the first player system is structured and arranged to enable a first player to bring a personal gaming system rented by the first player.

32. The system of claim 26 wherein the filtering glasses comprise a time-slotted filter configured to enable the first player to view less than all of the available time slots.

33. The system of claim 26 wherein the filtering glasses comprise a polarization filter configured to enable the first player to view less than all of the available polarizations.

34. The system of claim 26 wherein the filtering glasses comprise a Fourier filter configured to enable the first player to view the less than all of the available displays.

35. The system of claim 26 wherein the filtering glasses are configured to display more than one game on the first shared screen.

36. The system of claim 26 further comprising a localized display structured and arranged to enable the first player to view a localized display with content particular to the first user.

37. The system of claim 26 wherein the first player system is structured and arranged to control a subsystem that is part of a larger virtual system.

38. The system of claim 26 wherein the first shared screen is divided into more than one display.

39. The system of clam 26 further comprising a duplicating device structured and arranged to share gaming environment information through a duplicating switch, the duplicating switch comprising hardware configured to receive a data set, duplicate content in the data set to a duplicated data unit, and transmit the duplicated data unit to one or gaming systems.

40. The system of claim 39 further comprising a filtering processor structured and arranged to selectively filter gaming environment information to prevent gaming environment information from being communicated between gaming systems based on rules established under a rule system for the game for preventing sharing of the information among players.

41. The system of claim 26 further comprising a directory processor structured and arranged to enable a community of players to interact with one another in the gaming environment.

42. The system of claim 41 wherein the community of players interact with one another through messaging communications.

43. The system of claim 41 wherein the community of players interact with one another through voice communications.

44. The system of claim 41 wherein the directory processor is structured and arranged to configure virtual game systems with each player to be proximate to the virtual game systems of other players in the community of players so that the virtual game systems interact in the gaming environment.

45. The system of claim 41 further comprising a management processor structured and arranged to enable a first player to manage membership in the community of players.

46. The system of claim 41 wherein the management processor is structure and arranged to assemble the community players.

47. The system of claim 41 further comprising an access processor structured and arranged to provide the community of members access to a private gaming environment, wherein access to the private gaming is limited to the community of members.

48. The system of claim 41 wherein the directory processor is structured and arranged to organize the community of members around a preference common to the community of members.

49. The system of claim 41 wherein the community of members comprises a team of virtual game systems.

50. The system of claim 41 further comprising a membership processor structured and ranged to enable the first player to maintain a virtual identity that persists for two or more gaming sessions in the gaming environment.

51. The system of claim 41 further comprising an archiving processor structured and ranged to archive a state of the gaming environment so that the gaming environment may be resumed between a first session and a second session.

52. A multiple player game system comprising:
- means for enabling input to and control of a gaming environment by a first player at a first location;
- means for enabling input and control of the gaming environment by a second player at the first location;
- means for displaying the gaming environment on a first shared screen that is operated by a first commercial entity and is divided into two or more localized displays that render player-specific content;
- means for enabling the first player the gaming environment to view a first of the localized displays and content displayed by the first localized display that is specific to the first player by viewing the first shared screen through a pair of filtering glasses having a first configuration corresponding to the first localized display, and
- means for enabling the second plays in the gaming environment to view a second of the localized displays and content displayed by the second localized display that is specific to the second player and different than the content displayed by the first localized display by viewing the first shared screen through a second pair of filtering glasses having a second configuration corresponding to the second localized display; and
- means for displaying the gaming environment for a third player at a second location that is different from the first location on a second screen that is operated by a second commercial entity.

53. The multiple player game system of claim 52 wherein the first and second commercial entities each differ from either of the first and third players.

54. The multiple player game system of claim 52 wherein the first and second commercial entities commercialize services related to the gaming environment for at least one of the first and third players.

55. A multiple player game system comprising:
- a first player processing component structured and arranged to enable input to and control of a gaming environment by a first player at a first location;
- a second communications processing component structured and arranged to receive communications related to input and control of the gaming environment by a second player at the first location; and
- a first display processing component structured and arranged to:
  - display the gaming environment on a first shared screen that is operated by a first commercial entity and is divided into two or more localized displays that render player-specific content;
  - enable the first player in the gaming environment to view a first of the localized displays and content displayed by the first localized display that is specific to the first player by viewing the first shared screen through a pair of filtering glasses having a first configuration corresponding to the first localized display, and
  - enable the second player in the gaming environment to view a second of the localized displays and content displayed by the second localized display that is specific to the second player and different than the content displayed by the first localized display by viewing the first shared screen through a second pair of filtering glasses having a second configuration corresponding to the second localized display.

* * * * *